United States Patent
Li et al.

(10) Patent No.: US 11,243,929 B2
(45) Date of Patent: Feb. 8, 2022

(54) SYSTEM AND METHOD FOR DYNAMIC BULK DATA INGESTION PRIORITIZATION

(71) Applicant: VISA INTERNATIONAL SERVICE ASSOCIATION, San Francisco, CA (US)

(72) Inventors: Peijie Li, Austin, TX (US); Yu Gu, Austin, TX (US); Hongqin Song, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 349 days.

(21) Appl. No.: 16/058,724

(22) Filed: Aug. 8, 2018

(65) Prior Publication Data
US 2020/0050676 A1    Feb. 13, 2020

(51) Int. Cl.
| | |
|---|---|
| *G06F 16/22* | (2019.01) |
| *G06F 16/23* | (2019.01) |
| *G06F 12/0875* | (2016.01) |
| *G06F 12/126* | (2016.01) |

(52) U.S. Cl.
CPC ...... *G06F 16/2255* (2019.01); *G06F 12/0875* (2013.01); *G06F 12/126* (2013.01); *G06F 16/23* (2019.01)

(58) Field of Classification Search
CPC .. G06F 16/2255; G06F 16/23; G06F 12/0875; G06F 12/126
See application file for complete search history.

(56) References Cited

U.S. PATENT DOCUMENTS

| | | | | |
|---|---|---|---|---|
| 9,490,985 | B2 * | 11/2016 | Carlson | G06Q 20/4014 |
| 9,646,035 | B1 * | 5/2017 | Dickson | G06F 16/2255 |
| 9,798,672 | B1 * | 10/2017 | Svendsen | G06F 12/0875 |
| 9,798,754 | B1 | 10/2017 | Shilane | |
| 2013/0010950 | A1 * | 1/2013 | Kerschbaum | H04L 9/008 380/30 |
| 2013/0227051 | A1 | 8/2013 | Khakpour | |
| 2015/0081710 | A1 * | 3/2015 | Ketkar | G06N 7/005 707/737 |

(Continued)

OTHER PUBLICATIONS

Extended European Search Report for Application No. EP19190847.4, dated Dec. 12, 2019, 8 pages.

*Primary Examiner* — Tamara T Kyle
*Assistant Examiner* — Berhanu Mitiku
(74) *Attorney, Agent, or Firm* — Loeb & Loeb LLP (57) ABSTRACT

A data system may dynamically prioritize and ingest data so that, regardless of the memory size of the dataset hosted by the data system, it may process and analyze the hosted dataset in constant time. The system and method may implement a first space-efficient probabilistic data structure on the dataset, wherein the dataset includes a plurality of profile data. It may then receive update data corresponding to some of the plurality of profile data and implement a second space-efficient probabilistic data structure on the dataset including the update data. The system and method may then determine a set of non-shared profile data of the second space-efficient probabilistic data structure and prioritize the set of non-shared profile data of the second space-efficient probabilistic data structure over other profile data of the dataset for caching.

18 Claims, 6 Drawing Sheets

(56) References Cited

U.S. PATENT DOCUMENTS

| | | | |
|---|---|---|---|
| 2015/0161194 A1* | 6/2015 | Provenzano | G06F 16/24 707/690 |
| 2016/0092699 A1* | 3/2016 | Riva | H04L 67/02 726/26 |
| 2019/0065621 A1* | 2/2019 | Boles | G06F 16/22 |

* cited by examiner

SYSTEM AND METHOD FOR DYNAMIC BULK DATA INGESTION PRIORITIZATION

BACKGROUND

The "Four Party Model" describes the data network and various entities typically used in the credit card business model consisting of card networks, issuing banks ("issuers"), cardholders or consumers, merchants, and acquirer. Virtually all electronic card payments are constructed on the back of the Four Party Model as it serves to keep the entire system working together. The consumer receives a payment card account from the issuer. The account could be a credit, debit, or prepaid type of account linked to a payment device. The account can operate via a number of different methods including the Internet, a physical card, or mobile devices.

A typical transaction occurs in three phases: authorization, clearing, and settlement. During authorization, a cardholder or consumer chooses goods and services they wish to purchase using the payment device linked to an issuer account. The merchant's acquirer bank receives the transaction from the merchant and contacts the card network (e.g., Diner's Club, Discover, etc.) to check card security features and sends the transaction to the cardholder's bank for approval. The issuer approves the transaction as well as the card network and replies to the merchant's bank. The merchant's bank sends approval to the merchant, and the cardholder completes the transaction and receives a receipt. During clearing, the merchant's bank sends a clearing message including the purchase information to the card network which validates the purchase information and sends the purchase information to the cardholder's bank. The clearing process reconciles the merchant's bank and cardholder's bank for the transaction. At settlement, the cardholder's bank sends payment to the card network, and the card network sends the payment to the merchant's bank. The merchants bank then pays the merchant, and the cardholder's bank bills the cardholder.

Over time, transactions build a profile for each account holder. Electronic payment systems typically create, process, and store billions of actions on a daily basis. For example, purchases, account information changes, transfers, balance inquiries, and other actions within each account are processed and then stored within a caching system for fast data access. Current solutions for account profile data management have created these profiles by batch processing and daily caching. For example, electronic payment network systems employ conventional error-free hashing techniques. Given the large amount of data, the caching process can take more than 4-5 hours to complete. Over time, as the amount of historical data for each account increases, this caching process will only become more cumbersome.

Fast access to the most recent profile data is crucial for identifying fraud and limiting the amount of damage fraud can cause. Stale data may prevent a valid transaction from approval, or inadvertently approve a fraudulent transaction. Yet, ever-increasing amounts of data and the time-consuming caching process may present opportunities for error and fraud.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

The present disclosure provides a technical solution to the technical problem of bulk data digestion and prioritization in large datasets hosted by data systems. As profile data and updates to the profile data are periodically ingested with the system, the profile data may be prioritized so that critical profiles having larger application or impact to the overall system or process that uses the profile data may be ingested into the caching system first. Present data systems cache profile data and update directly. Thus, as the size of the dataset increases, the amount of time required to cache the dataset also increases. Rather than caching profile data files directly, the systems and methods described herein may employ a plurality of space-efficient probabilistic data structures on the dataset hosted by the system in order to prioritize profile data of the dataset and cache higher priority, frequently changing profile data before caching other profile data. For example, profile data may be placed into multiple segments, each with different importance or caching priority for storing at a caching system. The profiles (or a representation of each profile such as a profile key) within each segment may then be put into a corresponding segment Bloom filter. As new data arrives, the data and/or its key will also be put into a new corresponding segment Bloom filter. After or while the new data streams in, the system may then perform an intersection of a first Bloom filter set created at time n and a second Bloom filter set created at time n+1 to get the common profile data within each segment. Profile data that are common to the intersection indicate those profile data having low activity or change and, thus, low priority. Profile data that are not common would have a higher priority to update for two reasons: first, all non-shared profile data in a new profile set are new and reflect activity, and second, non-shared profiles in the older of the two sets are no longer relevant for the segment, leaving all other profile data with a higher priority.

In some embodiments, a computer-implemented method of a data system may dynamically prioritize and ingest data so that, regardless of the memory size of the dataset hosted by the data system, it may process and analyze the hosted dataset in constant time. The method may implement a first space-efficient probabilistic data structure on the dataset, wherein the dataset includes a plurality of profile data. It may then receive update data corresponding to some of the plurality of profile data and implement a second space-efficient probabilistic data structure on the dataset including the update data. In some embodiments, the method may implement the second data structure as the update data streams in. The method may also determine a set of non-shared profile data of the second space-efficient probabilistic data structure and prioritize the set of non-shared profile data of the second space-efficient probabilistic data structure over other profile data of the dataset for caching.

In further embodiments, a system for bulk data ingestion prioritization in a data system may comprise a data repository, a processor, and a memory hosting an ingestion prioritization module. The data repository may store a dataset corresponding to a plurality profile datasets, and each of the profile datasets may correspond to a primary account number and include transaction data. The ingestion prioritization module may include instructions for execution by the processor for implementing a first space-efficient probabilistic data structure on one or more of the profile datasets of the data repository and receiving update data corresponding to some of the plurality of profile datasets. The module may also include instructions for updating the dataset to include the update data and implement a second space-efficient probabilistic data structure on the one or more profile datasets including the update data. In some embodiments, the system may implement the second data structure as the update data streams in. Further instructions of the dataset may determine a set of non-shared profile data of the second space-efficient probabilistic data structure, and prioritize the set of non-shared profile data of the second space-efficient probabilistic data structure over other profile data of the dataset.

BRIEF DESCRIPTION OF THE FIGURES

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meanings have otherwise been set forth herein.

SPECIFICATION

The present invention now will be described more fully with reference to the accompanying drawings, which form a part hereof, and which show, by way of illustration, specific exemplary embodiments by which the invention may be practiced. These illustrations and exemplary embodiments are presented with the understanding that the present disclosure is an exemplification of the principles of one or more inventions and is not intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, components, or devices. Accordingly, the present invention may take the form of an entirely hardware embodiment, an entirely software embodiment, or an embodiment combining software and hardware aspects. The following detailed description is, therefore, not to be taken in a limiting sense.

Figure 1:
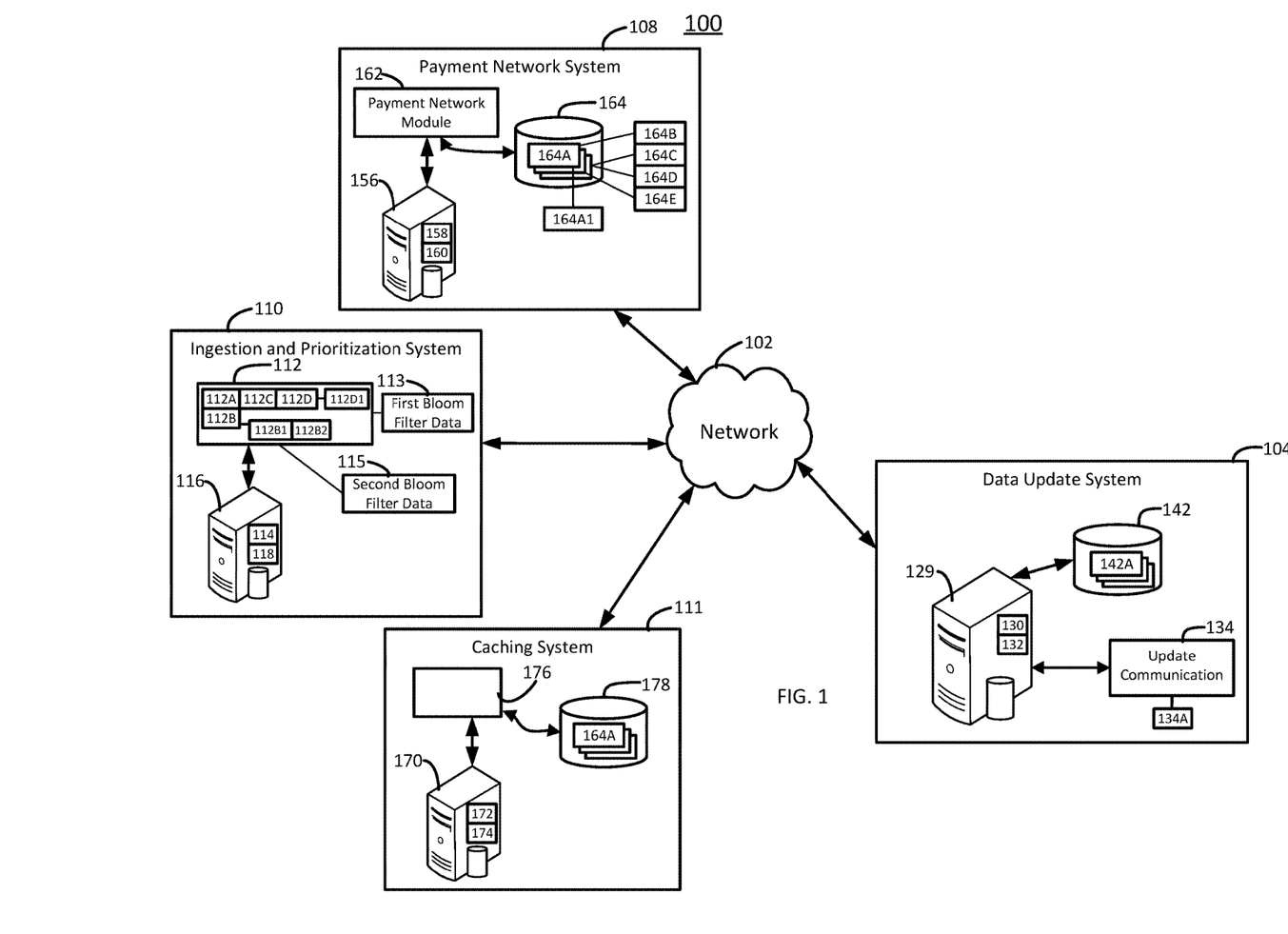
FIG. 1 shows an illustration of an exemplary bulk data ingestion prioritization system.

FIG. 1 generally illustrates one embodiment of a bulk data ingestion prioritization system 100 for identifying, segmenting, compacting, and caching high-priority profile data 164A of an account holder data repository 164 from a scalable profile service such as a payment network system 108. The system 100 may include a computer network 102 that links one or more systems and computer components. In some embodiments, the system 100 includes a data update system 104, a payment network system 108, segmentation system 110, and a payment device issuer system 111.

The network 102 may be described variously as a communication link, computer network, internet connection, etc. The system 100 may include various software or computer-executable instructions or components stored on tangible memories and specialized hardware components or modules that employ the software and instructions to identify related transaction nodes for a plurality of transactions by monitoring transaction communications between users and merchants as well as other parties in the "Four Party Model," as described herein.

The various modules may be implemented as computer-readable storage memories containing computer-readable instructions (i.e., software) for execution by one or more processors of the system 100 within a specialized or unique computing device. The modules may perform the various tasks, methods, modules, etc., as described herein. The system 100 may also include both hardware and software applications, as well as various data communications channels for communicating data between the various specialized and unique hardware and software components.

Networks are commonly thought to comprise the interconnection and interoperation of hardware, data, and other entities. A computer network, or data network, is a digital telecommunications network which allows nodes to share resources. In computer networks, computing devices exchange data with each other using connections, i.e., data links, between nodes. Hardware networks, for example, may include clients, servers, and intermediary nodes in a graph topology. In a similar fashion, data networks may include data nodes in a graph topology where each node includes related or linked information, software methods, and other data.

It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications or data network. A computer, other device, set of related data, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The data update system 104 may include a computing device such as an update server 129 including a processor 130 and memory 132 including components to facilitate updating one or more profile data 164A. In some embodiments, the profile data 164A each include a cumulative record of actions associated with an identifier. For example, each profile data 164A may be the cumulative record of transactions associated with a primary account number ("PAN") of a payment device 400 (FIG. 4A and FIG. 4B) such as a credit card or other device. Transactions may include purchases, account information edits or updates, transfers, and other changes or additions to the profile data 164A. In some embodiments, the memory 132 may include an update communication module 134. The update communication module 134 may include instructions to send update data 134A to other entities (i.e., 108, 110, 111, etc.) of the system 100 to indicate a transaction has been initiated with a computing device that is remote from the system including payment device data and other data as herein described. For example, a transaction may be initiated at a user computing device (PC. Mobile phone, tablet, etc.), a point-of-sale ("POS") computer (e.g., a merchant checkout device), or other computer. The data update system 106 may also include an update repository 142 and instructions to cause the processor 130 to store payment and other transaction data 142A within the update repository 142. In some embodiments, the data update system 104 generally and the update communication module 134 in particular may cause the processor 130 to execute instructions to access and modify one or more of the profile data 164A, add a transaction to the one or more profile data 164A, or other actions to update the one or more profile data 164A via the network 102. In further embodiments, the data update system 104 may send update data 134A corresponding to an identifier (e.g., the PAN of a payment device 400 (FIGS. 4A and 4B)) to the payment network system 108 or other entities of the system 100, as received from a remote computer system.

The payment network system 108 may include a payment network server 156 including a processor 158 and memory 160. The memory 160 may include a payment network module 162 including instructions to facilitate payment between parties (e.g., one or more users, merchants, etc.) using the system 100. The module 162 may be communicably connected to an account holder data repository 164 including profile data 164A. The profile data 164A may include any data to facilitate payment and other funds transfers between system entities (i.e., 104, 110, and 111). For example, the profile data 164A may include identification data, cumulative account transaction history data, payment device data, etc. The module 162 may also include instructions to send payment messages 166 to other entities and components of the system 100 in order to complete transactions between users and/or merchants.

The ingestion prioritization system 110 may include one or more instruction modules. In some embodiments, an ingestion prioritization module 112 may be stored in a memory 118 and generally include instructions to cause a processor 114 of an ingestion prioritization server 116 to functionally communicate with a plurality of other computer-executable steps or sub-modules (e.g., sub-modules 112A, 112B, 112C) and components of the system 100 via the network 102. These modules 112A, 112B, 112C may include instructions that, upon loading into the server memory 118 and execution by one or more computer processors 114 segment, compact, prioritize, and communicate data with one or more other elements of the system 100 (e.g., the caching system 111, the payment network system 108, the data update system 104, etc.). For example, the system 100 may perform these functions on the profile data 164A, the update data 134A, and other data and further cause a caching system 111 to efficiently cache data updates for the system 100.

A segmentation module 112A may classify each of the profile data 164A and any received update data 134A of the dataset into one or more categories or segments (e.g., segments 164B-E). While FIG. 1 shows four profile data segments 164B, 164C, 164D, 164E, other embodiments may include fewer or more profile data segments. For example, where the segmentation module 112A is employed in a system for managing electronic payments linked to a payment device 400 (FIGS. 4A and 4B), the profile data 164A may be segmented by factors such as an importance segment 164B, a risk score segment 164C, a customer type segment 164D, a payment history segment 164E, etc. A risk score for each profile data 164A for use by the segmentation module 112A to place a particular profile data 164A into a risk score segment 164C may be a measure of how likely any given transaction is fraudulent based on a variety of factors. Factors attributing to the risk score may include a number, frequency, or other statistical measurements of past fraud claims associated with the PAN of the profile data 164A, a source of the transaction (e.g., IP address, location, account holder, etc.), type of transaction (e.g., account information change, purchase, refund, balance transfer, etc.), and other factors that could influence a determination of risk associated with each of the PANs associated with a profile data 164A. Customer type may be a data element of a particular profile data 164A that indicates whether the PAN is associated with an individual or a merchant. Payment history may a statistical measure of the transactions associated with the PAN for a profile data 164A. For example, the payment history may indicate a frequency, type, amount, merchant, and other factors associated with typical transactions for the PAN as recorded in the associated profile data 164A.

A compaction module 112B may reduce the data size of each profile data 164A and/or the collection of segments (e.g., segments 164B-E) and, thus, the amount of computer memory used by each profile data 164A individually and/or collectively as stored in one or computer memories (e.g., repositories 164, 178, 142, etc.) of the system 100. In some embodiments, the compaction module 112B may include instructions stored in a memory 118 and executed by the processor 114 to compress the data within the account holder data repository 164 and/or other data. For example, the compaction module 112B may include instructions to compress each profile data 164A. The compaction module 112B may include further instructions to compress the profile data 164A according to their corresponding segments, as described in relation to the segmentation module 112A, above. In some embodiments, the compaction module 112B may compress the profile data 164A within the importance segment 164B first, the risk score segment 164C second, the customer type segment 164D third, the payment history segment 164E fourth, or in some other order.

The compaction module 112B may include instructions to implement a space-efficient probabilistic data structure that, as further described herein, may be used to test whether a profile data 164A is a member of a set. For example, where the data repository 164 includes a very large number of segmented profile data 164A, the compaction module 112B may include instructions to implement a first and second Bloom filter on the profile data 164A.

Figure 2:
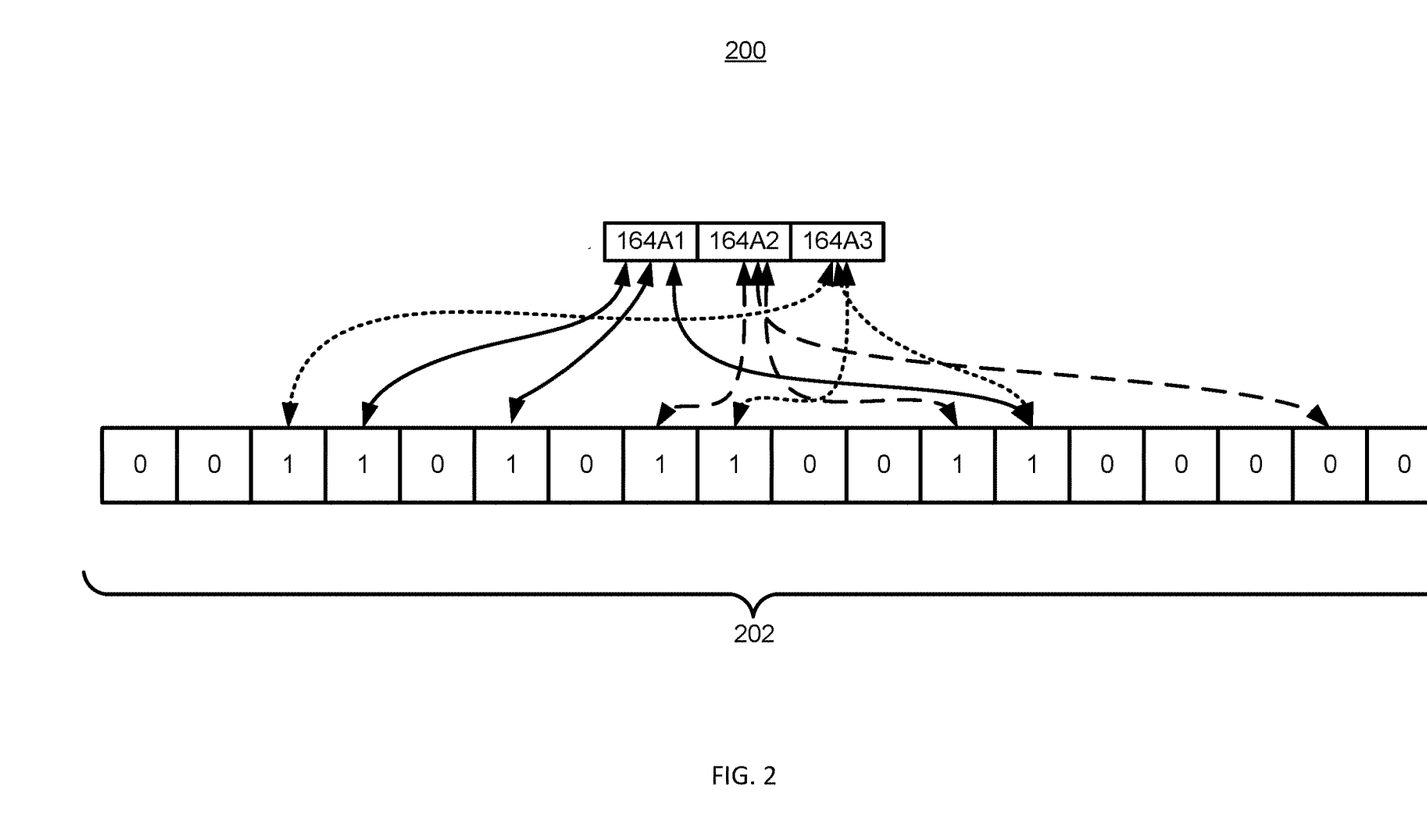
FIG. 2 shows an graphical representation of a space-efficient probabilistic data structure

An empty Bloom filter is a bit array of m bits, all set to 0, where the number of bits is proportional to the number of data elements. For example, the number of bits m may be proportional to the number of profile data 164A. The compaction module 112B may also define different hash functions k (e.g., 112B1, 112B2, etc.), and each of the hash functions maps a profile data 164A to one of the bit array m positions, generating a uniform random distribution. Typically, k is a constant, and smaller than m, which is proportional to the number of elements to be added; the precise choice of k and the constant of proportionality of m are determined by the intended false positive rate of the filter. With reference to FIG. 2, an example representation of a Bloom filter 200 shows the set of profile data {164A1, 164A3}. The dashed arrows show the positions in the bit array 202 that each set element is mapped to. The element 164A2 is not in the set {164A1, 164A3}, because it hashes to one bit-array position containing 0. For the Bloom filter 200, m=18 and k=2. For example, to query for the element 164A2, feed it to each of the k hash functions to get k bit array positions. If any of the bits at these positions is 0, the element is definitely not in the set. If the element 164A2 were in the set, then all the bits would have been set to 1 when it was inserted. If all are 1, then either the element is in the set, or the bits have been set to 1 during the insertion of other elements, resulting in a false positive.

The compaction module 112B may include instructions to implement a first Bloom filter 113 when each profile data 164A is ingested into a profile data cache 178 and a profile key (e.g., profile key 164A1) may be put into the first Bloom filter of the corresponding segment (e.g., the importance segment 164B). The compaction module 112B may also include instructions to implement a second Bloom filter 115 after update data 134A is received or while the update data 134A streams in at the data update system 104 and is passed to the ingestion prioritization system 110. Like the first Bloom filter 113, the profile key corresponding to the update data 134A is put into the second Bloom filter 115 of the segment (i.e., 164B, 164C, 164D, 164E, etc.) corresponding to the update data 134A.

While risking false positives, Bloom filters have a strong space advantage over other data structures for representing sets. For example, the profile data 164A within the repository 164 require storing at least the profile data themselves which, for long-standing merchant, retail, and other highly-active accounts, can require significant data storage. Bloom filters do not store the data items at all, and a separate solution must be provided for the actual storage (e.g., the repository 164 and/or the caching system 111). By employing a Bloom filter with 1% error and an optimal value of k, profile data 164A may be organized using only about 9.6 bits per element, regardless of the size of the profile data 164A. The 1% false-positive rate can be reduced by employing further organization techniques such as by prioritizing the profile data 164A as further described herein.

Bloom filters also have the unusual property that the time needed either to add items or to check whether an item is in the set is a fixed constant, O(k), completely independent of the number of items already in the set. No other constant-space set data structure has this property. Likewise, in a hardware implementation, Bloom filter implementations outpace other caching techniques because the Bloom filter k lookups are independent and can be parallelized.

A prioritization module 112C may use the results of the compaction module 112B to reduce the amount of daily caching performed by the caching system 111 that is needed to obtain a substantially accurate understanding of which daily transactions within each of the profile data 164A are likely to exhibit certain patterns such as fraud and others. For example, as explained above, employing a Bloom filter on the profile data 164A within each segment (e.g., 164B, 164C, 164D, 164E, etc.) may allow false positives, but will not allow false negatives. And while the larger the number of profile data 164A, the larger the probability of false positives for whether any particular profile data 164A is within a set, executing the instructions of the prioritization module 112C eliminates adverse results from the false-positive aspects of the Bloom filter within the caching process in order to quickly identify fraud and other patterns for transactions within the profile data 164A.

Figure 3:
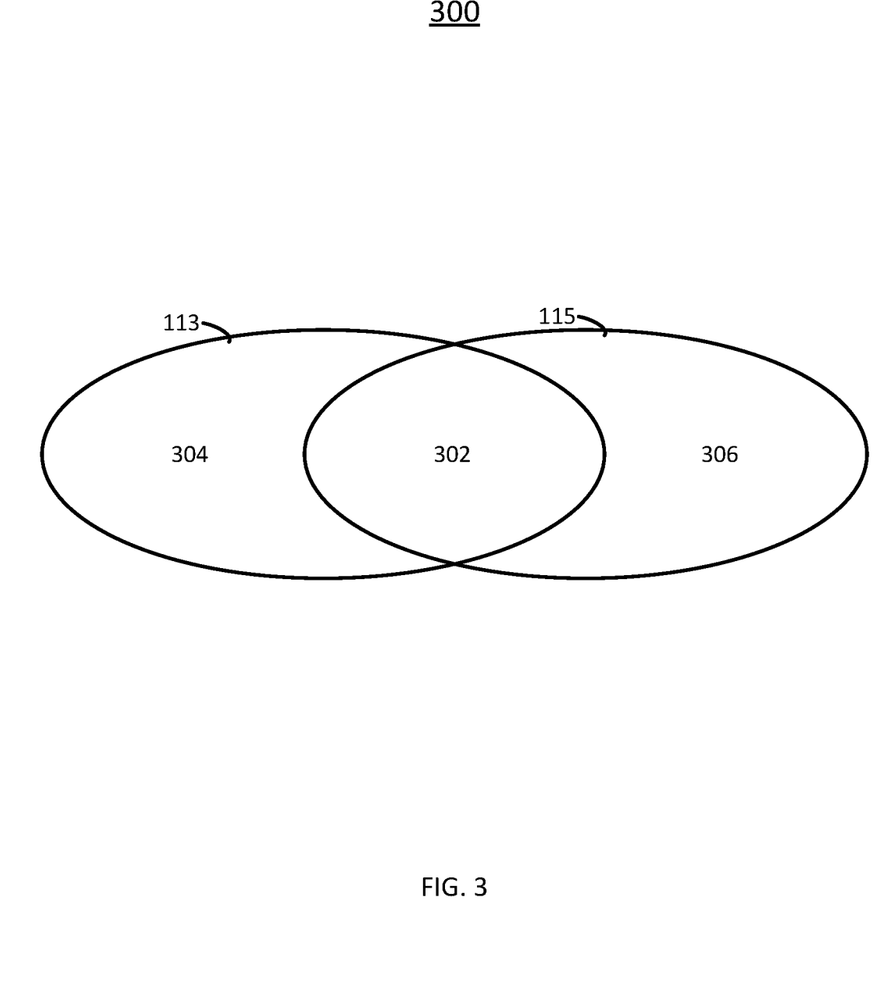
FIG. 3 is an illustration of a data intersection of at least two space-efficient probabilistic data structure.

The prioritization module 112C may include instructions to prioritize the profile data 164A for storage within the caching system 111. In some embodiments, the module 112C may include instructions to perform an intersection of the first Bloom filter 113 and the second Bloom filter 115. The instructions may perform the intersection while or after the update data 143A streams in to the system 100. With reference to FIG. 3, the intersection 300 may identify different priorities of profile data 164A for transfer to the caching system 111. For example, the intersection 300 may identify common data 302 that are profile data 164A present in both the first Bloom filter 113 and the second bloom filter 115 for each profile data segment (e.g., 164B, 164C, 164D, 164E, etc.). This common data 302 are those profile data 164A without much change (i.e., with little or no update data 134A), and, therefore, have a low priority for transferring to the caching system 111. Similarly, the intersection 300 also identifies non-shared profile data 164A between the first Bloom filter 113 and the second Bloom filter 115. Profile data 164A identified by the intersection 300 as first Bloom filter non-shared data 304 are no longer in the segment (i.e., 164B, 164C, 164D, 164E, etc.). These first Bloom filter non-shared data 304 may trigger false-positive results for fraud detection and other downstream applications and, therefore, may also have a low priority for transferring to the caching system 111. Profile data 164A identified by the intersection 300 as second Bloom filter non-shared data are both within the segment (i.e., 164B, 164C, 164D, 164E, etc.) and include update data 134A. These second Bloom filter non-shared data 306 are, therefore, high priority for passing to the caching system 111 since membership of a profile data 164A within the set of non-shared profile data 306 of the second Bloom filter 115 indicates that the system has received update data 134 for that profile.

A communication module 112D may receive update data 134A from one or more of the payment network system 108 and the data update system 104 and send profile data 164A to the caching system 111 after ingestion prioritization, as described above in relation to the ingestion prioritization system 110. For example, the communication module 112D may include instructions stored in the memory 118 and executed on the processor 114 to send profile data 164A to the caching system 111 according to a prioritization schedule 112D1. The prioritization schedule 112D1 may include data that rank orders profile data 164A according to when it should be sent to the caching system 111 for caching. For example, the set of non-shared profile data 306 of the second Bloom filter 115 may be rank-ordered for sending to the caching system 111 sooner than either the common data 302 or the first Bloom filter non-shared data 304.

The caching system 111 may also include one or more instruction modules. In some embodiments, a caching module 176 may be stored in a memory 174 and generally include instructions to cause a processor 172 of a caching server 170 to functionally communicate with a plurality of other systems and computer-executable steps or sub-modules of the system (e.g., the ingestion prioritization system 10, the sub-modules 112A, 112B, 112C, etc.) and components of the system 100 via the network 102. The module 176 may include instructions that, upon loading into the server memory 174 and execution by one or more computer processors 172 store profile data 164A within a cache repository 178 for quick access by the payment network system 108 or other components of the system 100.

The caching module 176 may include instructions to receive one or more profile data 164A from the ingestion prioritization system and store the received profile data 164A within the cache repository 178. In some embodiments, the caching module 178 may receive profile data 164A according to the prioritization schedule 112D1. For example, the caching system 111 may periodically receive and cache profile data 164A that frequently changes (e.g., the set of non-shared profile data 306 of the second Bloom filter 115 or profile data 164A not appearing in the first Bloom filter 113) before receiving profile data 164A that changes less frequently (e.g., profile data 164A appearing in the first Bloom filter 113). Upon receipt, the caching system 111 may store the prioritized profile data 164A from the ingestion prioritization system 110 within the cache repository. The received profile data 164A may be cached by segment (e.g., 164B, 164C, 164D, 164E, etc.) or another file structure, as required for efficient access by the payment network system 108. In some embodiments, the set of non-shared profile data 306 of the second Bloom filter 115 or profile data 164A not appearing in the first Bloom filter 113 may be cached within new files of the cache repository 178 while the profile data 164A only appearing in the first Bloom filter 113 may be cached within different files of the cache repository 178. The caching system 111 may periodically receive and cache the profile data 164 according to a set schedule (i.e., one or more times daily). In other embodiments, the caching system may receive and cache the profile data 164A dynamically as the update data 134A is processed by the ingestion prioritization system 110. After caching the profile data 164A, the second Bloom filter may be re-named to become the first Bloom filter 113 and the previous first Bloom filter may be deleted or logged.

Figure 4A:
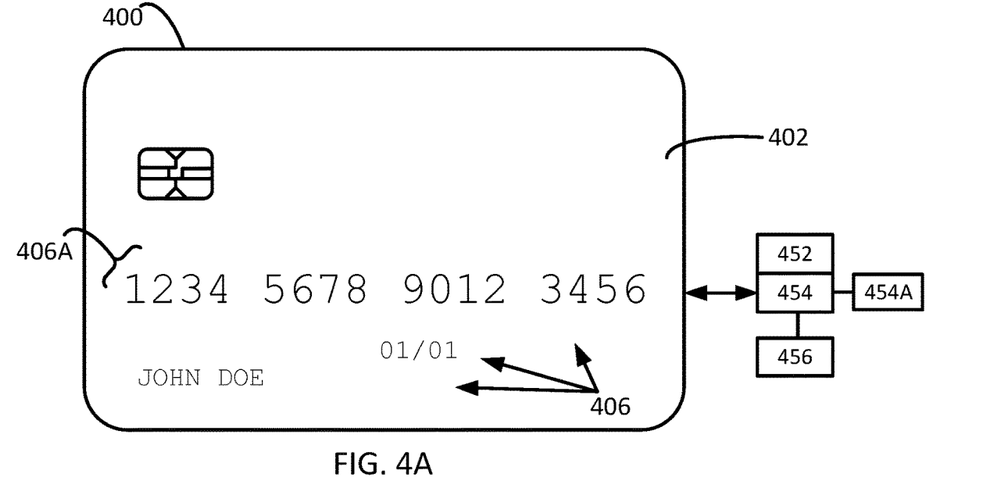
FIGS. 4A and 4B show an example payment device.
Figure 4B:
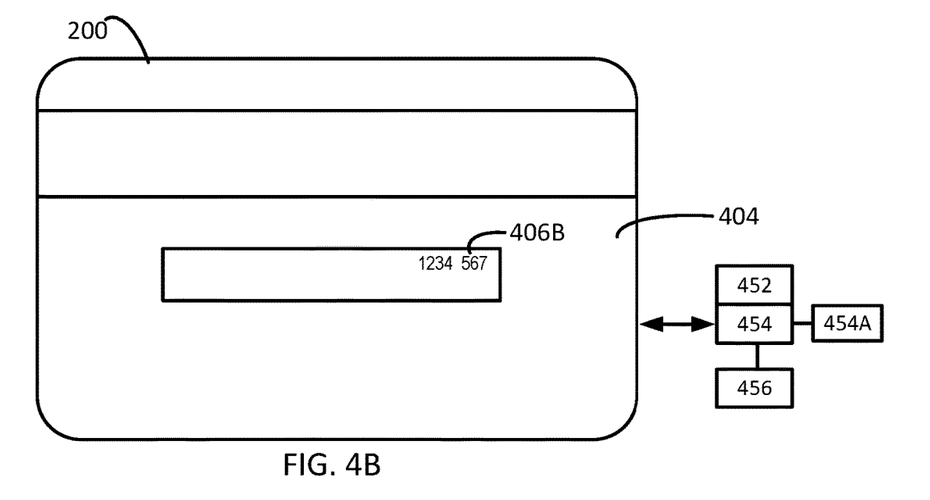

With brief reference to FIGS. 4A and 4B, an exemplary payment device 400 may take on a variety of shapes and forms. In some embodiments, the payment device 400 is a traditional card such as a debit card or credit card. In other embodiments, the payment device 400 may be a fob on a key chain, an NFC wearable, or other device. In other embodiments, the payment device 400 may be an electronic wallet where one account from a plurality of accounts previously stored in the wallet is selected and communicated to the system 100 to execute a transaction and create update data 134A. As long as the payment device 400 is able to communicate securely with the system 100 and its components, the form of the payment device 400 may not be especially critical and may be a design choice. For example, many legacy payment devices may have to be read by a magnetic stripe reader and thus, the payment device 400 may have to be sized to fit through a magnetic card reader. In other examples, the payment device 400 may communicate through near field communication and the form of the payment device 400 may be virtually any form. Of course, other forms may be possible based on the use of the card, the type of reader being used, etc.

Physically, the payment device 400 may be a card and the card may have a plurality of layers to contain the various elements that make up the payment device 400. In one embodiment, the payment device 400 may have a substantially flat front surface 402 and a substantially flat back surface 404 opposite the front surface 402. Logically, in some embodiments, the surfaces 402, 404 may have some embossments 406 or other forms of legible writing including a personal account number (PAN) 406A and the card verification number (CVN) 406B. In some embodiments, the payment device 400 may include data corresponding to the primary account holder, such as profile data 164A for the account holder. A memory 454, generally, and a module 454A, in particular, may be encrypted such that all data related to payment is secure from unwanted third parties. A communication interface 456 may include instructions to facilitate sending payment data as a payment payload, a payment token, or other data to identify payment information to one or more components of the system 100 via the network 102.

Figure 5:
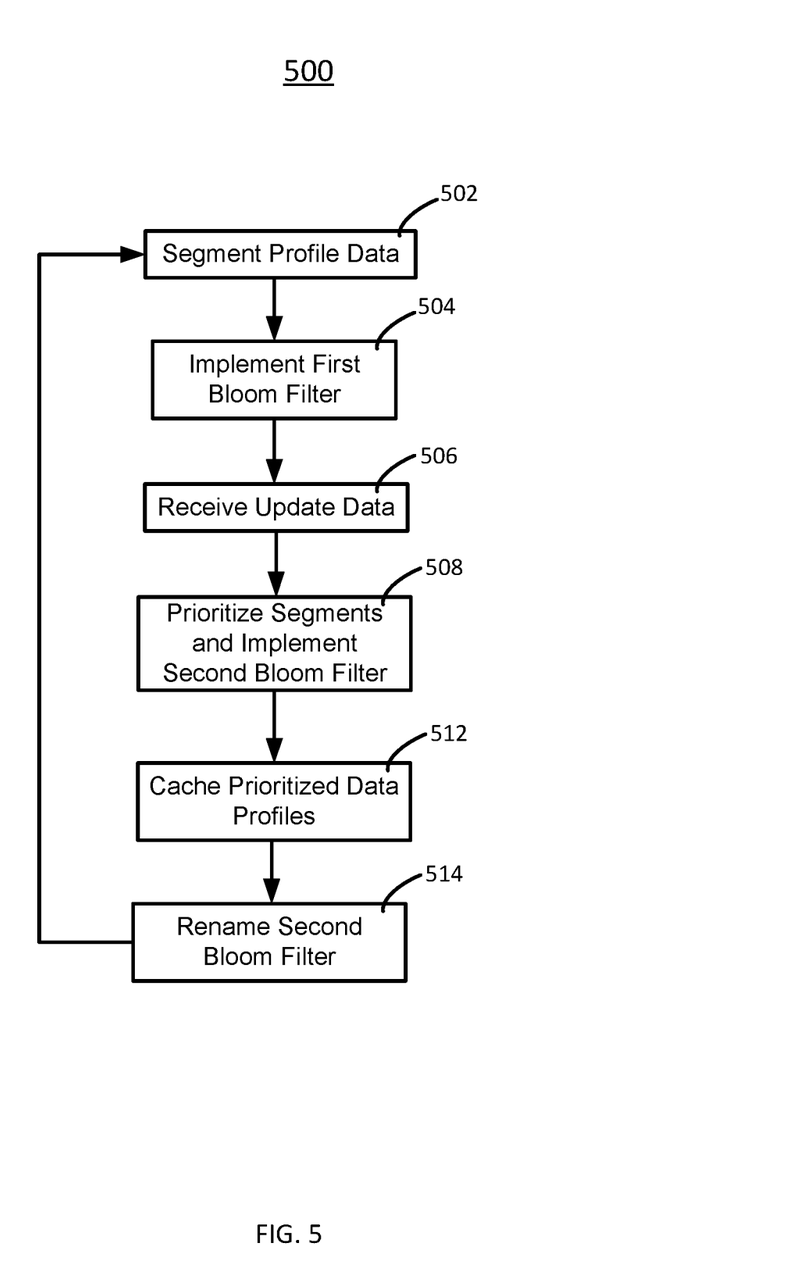
FIG. 5 is a flowchart of a method for dynamic bulk data ingestion prioritization.

FIG. 5 is a flowchart of a method 500 for dynamic bulk data ingestion prioritization within the system 100. Each step of the method 500 may be stored in a memory and executed on a processor of a server or other computing device of the system 100 which may be physically configured to execute the different aspects of the method. Each step may include execution of any of the instructions as described in relation to the system 100. While the below blocks are presented as an ordered set, the various steps described may be executed in any particular order to complete the bulk data ingestion prioritization methods described herein.

At block 502, the method 500 may segment the profile data 164A. In some embodiments, the segmentation module 112A may classify each of the profile data 164A into one or more categories or segments (e.g., segments 164B-E).

At block 504, the method 500 may reduce the data size of each profile data 164A and/or the collection of segments (e.g., segments 164B, 164C, 164D, 164E) and, thus, the amount of computer memory used by each profile data 164A individually and/or collectively as stored in one or computer memories (e.g., repositories 164, 178, 142, etc.) of the system 100. As described herein in relation to the compaction module 112B, block 506 may implement a space-efficient probabilistic data structure. In some embodiments, the structure may be a first Bloom filter 113 as described above.

At block 506, the system 100 may receive update data 134A corresponding to one or more data profiles 164A as described herein. In some embodiments, the update data 134A may correspond to profile data 164A that is stored within the system 100 at the time the update data 134A is received. In other embodiments, the update data 134A may correspond to a new profile data 164A that does not yet exist when the update data 134A is received. If the update data 134A does not correspond to an existing profile data 164A, then the method may create a new profile data 164A corresponding to the update data 134A via a PAN or other identifier for the profile data 164A. The update communication module 134 may communicate the update data 134A to the network 102 and on to other entities of the system 100. Block 502 may also execute instructions to store the update data 134A, payment and other transaction data 142A within the update repository 142. Block 506 may also segment the update data 134A to one or more corresponding categories or segments (e.g., segments 164B-E).

At block 508, the method 500 may prioritize the profile data 164A for storage within the caching system 111 and reduce the data size of each profile data 164A and/or the collection of segments (e.g., segments 164B, 164C, 164D, 164E) including the update data 134A received at block 506. In some embodiments, the structure may be a second Bloom filter 115, as described above, and may be implemented as the update data 134A streams in to the system 100, as described herein. The method 500 may also perform an intersection 300 of the first Bloom filter 113 and the second Bloom filter 115 while or after the update data 14A streams in to the system 100. As described above, the intersection 300 may identify profile data 164A as second Bloom filter non-shared data 306 that are both within the segment (i.e., 164B, 164C, 164D, 164E, etc.) and include update data 134A. These second Bloom filter non-shared data 306 are high priority for passing to the caching system 111.

At block 512, the method 500 may cache the prioritized profile data 164A from block 510. In some embodiments, the method 500 may send profile data 164A to the caching system 111 according to a prioritization schedule 112D1. In some embodiments, the method 500 may rank order the profile data 164A according to when it should be cached by the caching system 111. For example, the set of non-shared profile data 306 of the second Bloom filter 115 may be rank-ordered for sending to the caching system 111 sooner than either the common data 302 or the first Bloom filter non-shared data 304. The method 500 may cache the rank-ordered profile data 164A within the cache repository 178. The method 500 may also cache the rank-ordered set of non-shared profile data 306 of the second Bloom filter 115 according to a dynamic schedule or a set schedule. For example, the method 500 may dynamically determine when to cache the set of non-shared profile data 306 of the second Bloom filter 115. Dynamic scheduling of the caching at block 512 may include initiating a caching process with when the set of non-shared profile data 306 of the second Bloom filter 115 meets certain conditions. For example, the block 512 may initiate a caching process with the set of non-shared profile data 306 of the second Bloom filter 115 reaches a particular number of profile data 164A sets or a memory size, or other conditions (e.g., indications of fraud, total dollar amount of transactions indicated by the profile data 164A, etc.).

At block 514, the method 500 may rename the second Bloom filter 115 to the first Bloom filter 113 for use in a next iteration of the method 500 for dynamic bulk data ingestion prioritization within the system 100. In some embodiments, the method 500 may cause a reference to a memory address of the second Bloom filter 115 to be associated with the first Bloom filter 113. The previous second Bloom filter 115 (now the first Bloom filter 113) may then be compared to a new Bloom filter that includes new update data 134.

Thus, systems and methods described herein provide a technical solution to the technical problem of bulk data digestion and prioritization in large data systems where fast and accurate access is needed to only some data associated with the system. Rather than caching all profile data 164A within a data system, as presently employed in large data systems generally and in payment network systems in particular, the profile data 164A having or receiving update data 134A are prioritized to be cached first, while other, lower priority data are cached later. This solution provides faster access to important data so that fraud, spending warnings, security issues, and other patterns may be identified sooner and, thus, more accurately than in previous systems.

Figure 6:
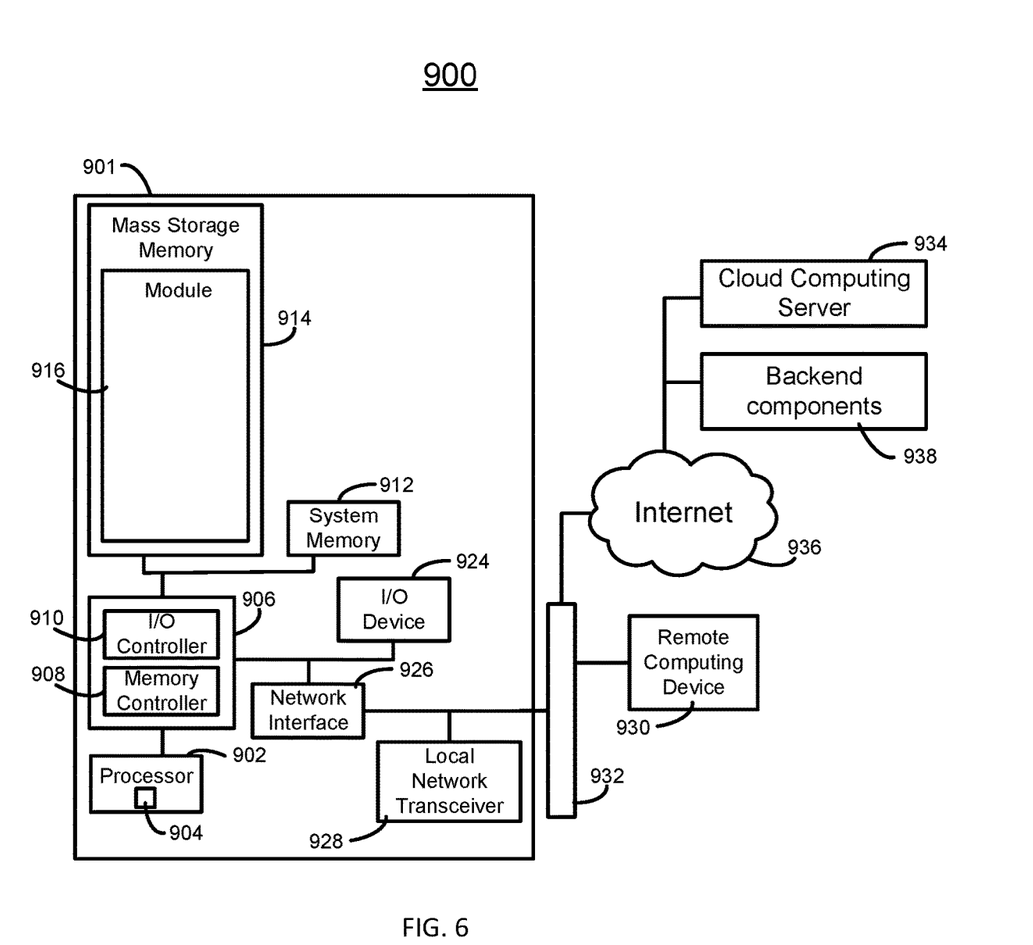
FIG. 6 shows an exemplary computing device that may be physically configured to execute the methods and include the various components described herein.

FIG. 6 is a high-level block diagram of an example computing environment 900 for the system 100 and methods (e.g., method 500) as described herein. The computing device 900 may include a server (e.g., the ingestion prioritization server 116, the data update server 129, the payment network server 156, the caching system server 170, etc.) mobile computing device (e.g., user computing system 104), a cellular phone, a tablet computer, a Wi-Fi-enabled device or other personal computing device capable of wireless or wired communication), a thin client, or other known type of computing device.

Logically, the various servers may be designed and built to specifically execute certain tasks. For example, the payment network server 156, ingestion prioritization server 116, and caching system server 170 may receive a large amount of data in a short period of time meaning the payment server may contain a special, high speed input output circuit to handle the large amount of data. Similarly, the ingestion prioritization server 116 may have increased processing power that is specially adapted to quickly execute the instructions, blocks, methods, etc., described herein.

As will be recognized by one skilled in the art, in light of the disclosure and teachings herein, other types of computing devices can be used that have different architectures. Processor systems similar or identical to the example systems and methods described herein may be used to implement and execute the example systems and methods described herein. Although the example system 100 is described below as including a plurality of peripherals, interfaces, chips, memories, etc., one or more of those elements may be omitted from other example processor systems used to implement and execute the example systems and methods. Also, other components may be added.

As shown in FIG. 6, the computing device 901 includes a processor 902 that is coupled to an interconnection bus. The processor 902 includes a register set or register space 904, which is depicted in FIG. 6 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 6, the computing device 901 may be a multi-processor device and, thus, may include one or more additional processors that are identical or similar to the processor 902 and that are communicatively coupled to the interconnection bus.

The processor 902 of FIG. 6 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 6 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. Moreover, while only one remote computing device 930 is illustrated in FIG. 6 to simplify and clarify the description, it is understood that any number of client computers are supported and can be in communication within the system 900.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method of bulk data ingestion prioritization in a data system comprising:
    implementing a first space-efficient probabilistic data structure on a dataset at time N, wherein the dataset includes a plurality of profile data at time N;
    receiving a first update dataset for the dataset corresponding to some of the plurality of profile data at time N+1;

implementing a second space-efficient probabilistic data structure on the dataset including the first update dataset at time N+1 subsequent to implementing the first space-efficient probabilistic data structure;

determining a set of non-shared profile data of the second space-efficient probabilistic data structure based on an intersection of the first space-efficient probabilistic data structure and the second space-efficient probabilistic data structure at time N+1;

caching the set of non-shared profile data of the second space-efficient probabilistic data structure into the data system before other profile data of the dataset at time N+1;

receiving a second update dataset for the dataset corresponding to some of the plurality of profile data at time N+2, the dataset including the plurality of profile data and the first update dataset corresponding to some of the plurality of profile data at time N+2; and renaming the second space-efficient probabilistic data structure to become a subsequent first space-efficient probabilistic data structure for a next iteration of the method at time N+3.

2. The method of claim 1, wherein the first space-efficient probabilistic data structure corresponds to a first Bloom filter and the second space-efficient probabilistic data structure corresponds to a second Bloom filter.

3. The method of claim 2, wherein the intersection includes an intersection of the first Bloom filter and the second Bloom filter.

4. The method of claim 3, further comprising identifying different priorities of profile data within the dataset using the intersection for caching at time N+1, wherein the set of non-shared profile data of the second space-efficient probabilistic data structure is a high priority for caching.

5. The method of claim 4, wherein the set of profile data present in both the first Bloom filter and the second Bloom filter is a low priority for caching.

6. The method of claim 3, further comprising prioritizing the set of non-shared profile data of the second space-efficient probabilistic data structure over other profile data of the dataset at time N+1 including rank ordering the profile data of the dataset according to a prioritization schedule.

7. The method of claim 6, further comprising segmenting the dataset into a plurality of dataset segments at time N+1 according to characteristics of the data profiles, each dataset segment including a different caching priority.

8. The method of claim 7, wherein the first Bloom filter corresponds to a plurality of first Bloom filters and each of the plurality of first Bloom filters corresponds to a different segment of the profile data.

9. The method of claim 8, wherein the different caching priority of each dataset segment includes one of an importance segment, a risk score segment, a customer type segment, or a payment history segment.

10. A system for bulk data ingestion prioritization in a data system comprising:
a data repository storing a dataset corresponding to a plurality profile datasets, each of the profile datasets corresponding to a primary account number and including transaction data; and
a processor and a memory hosting an ingestion prioritization module, wherein the ingestion prioritization module includes instructions for execution by the processor for:
implementing a first space-efficient probabilistic data structure on one or more of the profile datasets of the data repository at time N;

receiving a first update dataset for the one or more of the profile datasets corresponding to some of the plurality of profile datasets at time N+1;

implementing a second space-efficient probabilistic data structure on the one or more profile datasets including the first update dataset at time N+1 subsequent to implementing the first space-efficient probabilistic data structure;

determining a set of non-shared profile data of the second space-efficient probabilistic data structure based on an intersection of the first space-efficient probabilistic data structure and the second space-efficient probabilistic data structure at time N+1;

caching the set of non-shared profile data of the second space-efficient probabilistic data structure into the data system before other profile data of the dataset at time N+1;

receiving a second update dataset for the dataset corresponding to some of the plurality of profile data at time N+2, the dataset including the plurality of profile data and the first update dataset corresponding to some of the plurality of profile data at time N+2; and renaming the second space-efficient probabilistic data structure to become a subsequent first space-efficient probabilistic data structure for a next iteration of the method at time N+3.

11. The system of claim 10, wherein the first space-efficient probabilistic data structure corresponds to a first Bloom filter and the second space-efficient probabilistic data structure corresponds to a second Bloom filter.

12. The system of claim 11, wherein the intersection includes an intersection of the first Bloom filter and the second Bloom filter.

13. The system of claim 12, wherein the ingestion prioritization module includes further instructions for execution by the processor for identifying different priorities of profile data within the dataset using the intersection for caching at time N+1, wherein the set of non-shared profile data of the second space-efficient probabilistic data structure is a high priority for caching.

14. The system of claim 13, wherein the set of profile data present in both the first Bloom filter and the second Bloom filter is a low priority for caching.

15. The system of claim 12, further comprising an instruction for prioritizing the set of non-shared profile data of the second space-efficient probabilistic data structure over other profile data of the dataset at time N+1 including an instruction for rank ordering the profile data of the dataset according to a prioritization schedule.

16. The system of claim 15, further comprising an instruction for segmenting the dataset into a plurality of dataset segments at time N+1 according to characteristics of the data profiles, each dataset segment including a different caching priority.

17. The system of claim 16, wherein the first Bloom filter corresponds to a plurality of first Bloom filters and each of the plurality of first Bloom filters corresponds to a different segment of the profile data.

18. The system of claim 17, wherein the different caching priority of each dataset segment includes one of an importance segment, a risk score segment, a customer type segment, or a payment history segment.

* * * * *